Sept. 15, 1953 P. BAYER 2,652,035
HYDRAULIC ENGINE
Filed March 6, 1951 6 Sheets-Sheet 1

Philip Bayer
INVENTOR.

BY *Clarence A. O'Brien*
*and Harvey B. Jacobson*
Attorneys

Sept. 15, 1953 P. BAYER 2,652,035
HYDRAULIC ENGINE
Filed March 6, 1951 6 Sheets-Sheet 3

Philip Bayer
INVENTOR.

Sept. 15, 1953  P. BAYER  2,652,035
HYDRAULIC ENGINE
Filed March 6, 1951  6 Sheets-Sheet 5

Philip Bayer
INVENTOR.

Sept. 15, 1953 P. BAYER 2,652,035
HYDRAULIC ENGINE

Filed March 6, 1951 6 Sheets—Sheet 6

Philip Bayer
INVENTOR.

Patented Sept. 15, 1953

2,652,035

UNITED STATES PATENT OFFICE 2,652,035

HYDRAULIC ENGINE

Philip Bayer, Delaware, Ohio

Application March 6, 1951, Serial No. 214,067

9 Claims. (Cl. 121—120)

The present invention relates to improvements in hydraulic engines and more particularly to a hydraulic engine having supply and exhaust passages for selective intercommunication with the chamber above the piston, whereby reciprocation of the piston is effected, the drive shaft and connecting rod and crank assembly being provided for converting the reciprocating movement of the piston to rotating movement of the drive shaft.

An object of the present invention is to provide a means for selectively providing pressure and exhaust connections to the chamber above the piston of the hydraulic engine for alternately effecting the pressure and exhaust strokes of the piston.

A further object of the present invention resides in the provision of a transversely disposed reciprocable valve which alternately effects communication between the supply and exhaust passages and the chamber above the piston of the engine.

Still another object of the present invention resides in the provision of groove means on the piston walls and lower intermediate portions thereof for providing communication between the supply and exhaust passages and third and fourth passages whereby the opposite ends of the sliding valve are alternately supplied with communication with pressure and exhaust whereby reciprocation of the valve is effected for selectively providing communication between the chamber above the piston and the supply and exhaust passages.

Still another object of the present invention resides in the provision of means whereby a hydraulic engine can be constructed of a plurality of integrally joined tubular sections, each having a piston and slide valve combination, with the supply and exhaust passages of each of the sections being interconnected for alternate or sequential operation whereby rotation of the drive shaft will be more evenly effected.

Still further objects of the present invention will appear from a consideration of the detailed description to follow. The best form in which I have contemplated applying my invention is clearly illustrated in the accompanying drawings, wherein:

Referring more particularly to the drawings, wherein like numerals designate like parts throughout, the numeral 10 designates generally the housing of the hydraulic engine which is comprised of the tubular sections 12, 14 and 16. Each of the tubular sections 12, 14 and 16 is comprised of a cylinder portion 18 and a valve casing 20 secured to its outer end, a piston 22 being reciprocably disposed within the cylinder 18 and a slide valve means 24 being slidably disposed transversely of the valve casing 20.

The housing 10 also embodies a drive shaft, crank and connecting rod 26 for interconnecting the plurality of pistons of the hydraulic engine for simultaneous rotation of the drive shaft.

Figures 1, 2A:
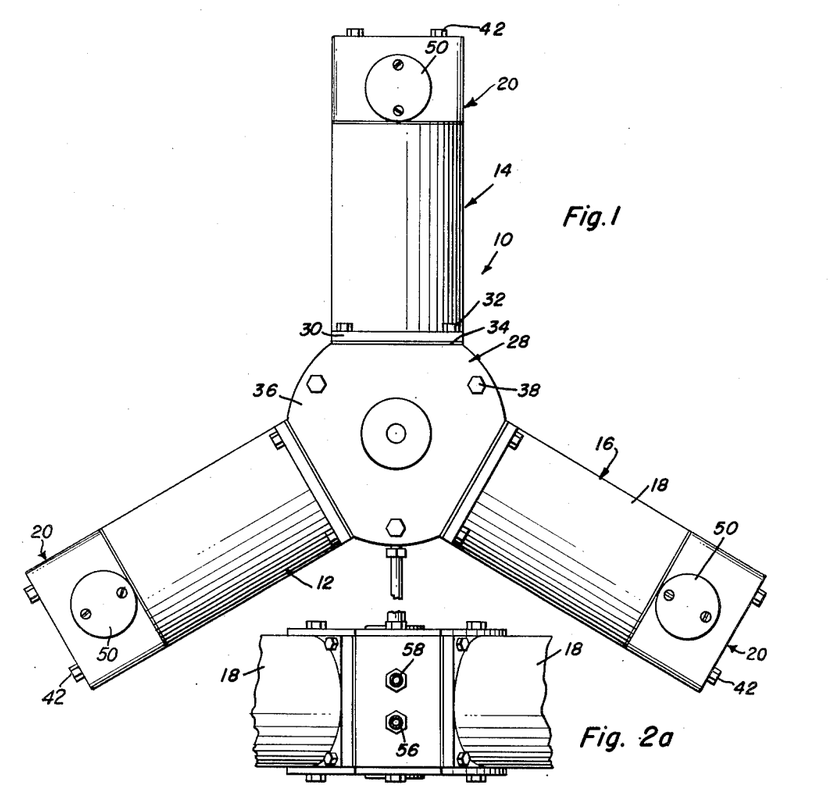
Figure 1 is a side elevational view of the hydraulic engine embodying a plurality of sections, the one being shown embodying three sections.
Figure 2a is a bottom plan view of the hydraulic engine with parts broken away.

Looking now at Figure 1, the housing 10, the tubular sections 12, 14 and 16 thereof will be seen to form an integral engine, the tubular sections 12, 14 and 16 being secured to the crank and drive shaft housing 28 by having their flanges 30 secured thereto by means of the bolts 32, gaskets 34 being interposed between the flanges 30 and the crank and drive shaft housing 28. The crank and drive shaft housing 28 is provided with a cover 36 which is secured to the cylindrical portion of the housing 28 by means of the bolts 38.

Figure 2:
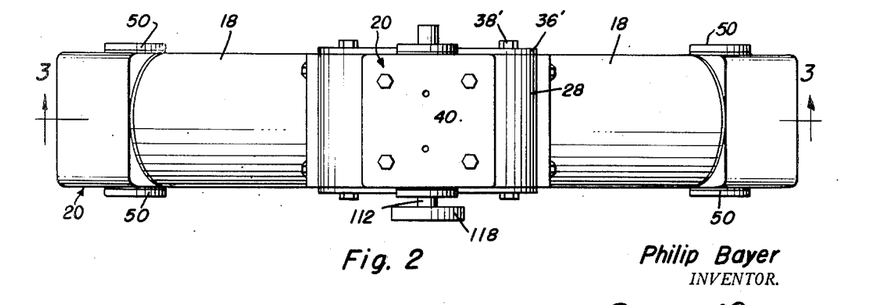
Figure 2 is a top plan view of the hydraulic engine of Figure 1.

As seen best in Figures 2 and 2a, a cover plate 36' is provided for closing the back side of the housing 28 by means of the bolts 38', either of the plates 36 or 36' being removable for access to the interior of the crank and drive shaft housing for adjustment and repair purposes.

Figure 6:
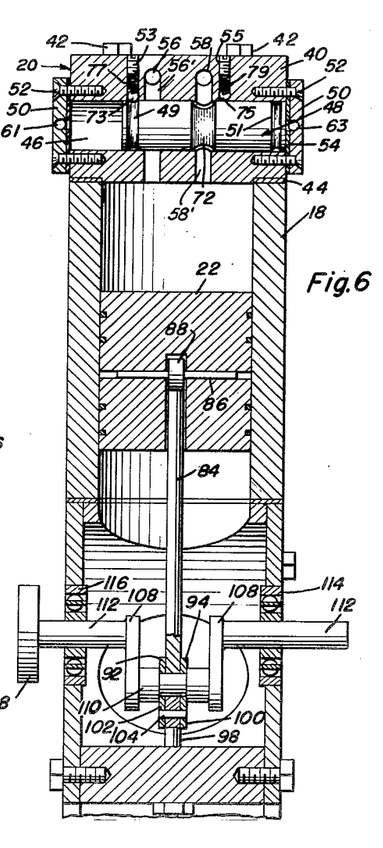
Figure 6 is a vertical transverse sectional view taken substantially along the plane of line 6—6 of Figure 3.

Looking now at Figures 1 and 6, it will be seen that the valve casings 20 are comprised of substantially rectangular members 40 which are secured to the outer ends of the tubular sections 12, 14 and 16, by means of the lugs 42, gaskets 44 being interposed between the bottom portions of the valve casings and the outer ends of the cylinders 18. The member 40 is provided with a transverse bore 46 which slidably receives the substantially cylindrical slide valve 48.

The ends of the bore 46 are closed by means of the plates 50 which are secured to the member 40 by means of the screws 52, a sealing element 54 being disposed between the underside of the closure plates 50 and the outer ends of the member 40.

Figures 3, 4, 5:
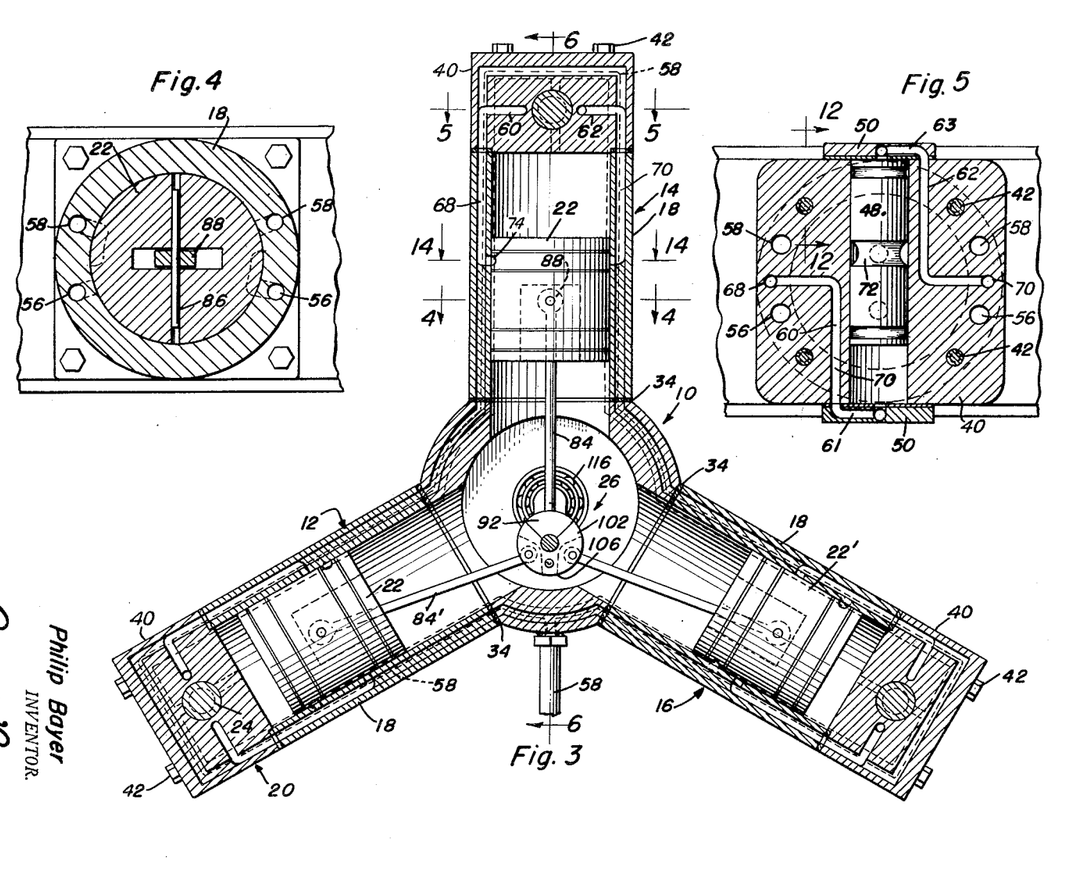
Figure 3 is a vertical longitudinal section view taken substantially along the plane of line 3—3 of Figure 2.
Figure 4 is a horizontal transverse sectional view taken substantially along the plane of line 4—4 of Figure 3.
Figure 5 is a horizontal transverse sectional view taken substantially along the plane of line 5—5 of Figure 3.

The member 40 is provided with supply and exhaust passages 56 and 58 which extend through the body adjacent the outer surfaces of the body, as best seen in Figure 3. The member 40 is also provided with third and fourth passages 60 and 62 which communicate with the opposite ends of the bore 46 to passages formed in the closure plates 50, as at 61 and 63.

The cylinders 18 and the crank and drive shaft housing 38 are also provided with passages which are interconnected with the supply and exhaust passages 56 and 58 of the valve casing 20. The supply and exhaust passages 56 and 58 extending through the walls of the cylinders 18 are provided with openings whereby communication between the supply and exhaust passages is effected with intermediate portions of the chamber of each of the cylinders 18, as at 64 and 66.

Looking now at Figure 5, it will be seen that the passages 61 and 63 within the closure plate 50 are communicated by passages 60 and 62 with the passages 68 and 70 respectively, which extend downwardly through the cylinder walls to a point adjacent to the openings from the supply and exhaust passages.

The valve means 24 is of the piston type, being of cylindrical form and having flat ends. An intermediate portion of the valve element 48 is formed with a cross-sectionally reduced portion 72 which is adapted to be selectively in communication with either of the first or second passages 56 and 58 respectively. The valve element 48 is formed at each end with a groove 49 and 51. The cylinders 18 have spaced parallel bores 53 and 55 in which are disposed spring pressed ball detents 73 and 75 urged by springs 77 and 79, screws 81 retaining the springs in the bores 53 and 55. The ball detents 73 and 75 are engageable in the grooves 49 and 51 when the valve element is in its end positions, whereby the valve element can be maintained in place notwithstanding any leakage of oil when the engine is not running. In this manner, the engine can be easily started since the valve elements will always be in their correct positions.

The pistons 22 are substantially of conventional form but are provided with upper and lower intermediately disposed grooves 74 and 76 and oppositely disposed grooves 78 and 80. Each of the pairs of grooves 74 and 76, and 78 and 80 are laterally offset from each other whereby when the piston is in either of its uppermost or lowermost positions, the preselected groove will effect communication between preselected of the supply and exhaust passages with the third and fourth passages 68 and 70.

The pistons 22 are also provided with piston rings 82 which are disposed on opposite sides of each of the grooves 74 through 80.

Figure 6 shows best the interconnection between the connecting rods 84 and the piston 22 as comprising a pin 86 extending transversely through the piston and engaged in the apertured end 88 of the rod 84. The lower end of the rod 84 is formed with a noncircular disk portion 90 which has a pair of disk portions 92 and 94 secured to opposite faces thereof. Second and third connecting rods 96 and 98 are pivotally connected to the disk portions 100 and 102 which are in turn fixedly secured to the pin 104. The pin 104 extends through an extension portion 106 of the disk portion 90, as seen in Figure 3.

The cranks are comprised of crank arms 108 fixedly secured to the crank shaft 110, the outer ends of the crank arms 108 being secured to the drive shaft 112 which extends out through apertures in the plates 36 and 36'. Ball bearing units 114 and 116 are fixedly secured to the plates 36 and 36' for rotatably supporting the complete crank shaft 112, 112. The power take-off means 118 can be secured to the outer end of the crank shaft 112, 112.

Looking now once again at Figure 3, it will be seen that the hydraulic engine includes a plurality of pistons connected to a common drive shaft. It will be further seen that each of the pistons is adapted to sequentially receive supply pressure for its power stroke whereby a substantially equal distribution of power will be obtained through the drive shaft. Thus, the lower piston 22 and piston 22' will be in their supply and exhausting positions respectively, while the upper piston 22 will be at the end of its power stroke and about to begin its exhaust stroke at the same time the lower piston 22 is about to begin its power stroke.

Looking now at the diagrammatic views 7 through 11, it will be seen that the operation of the hydraulic engine is relatively simple.

Figure 7:
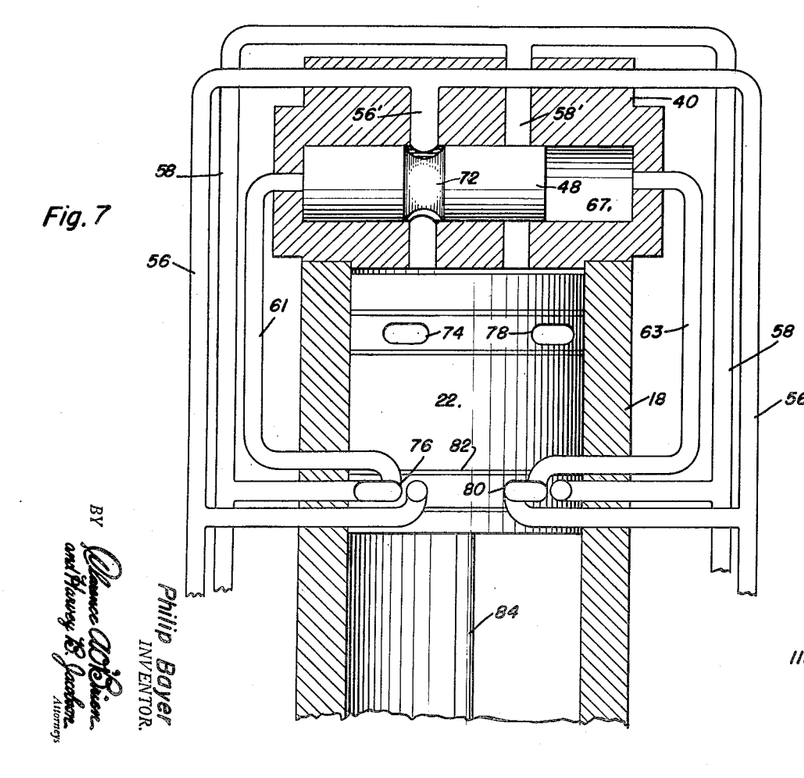
Figure 7 is a diagrammatic view of a single piston and slide valve arrangement showing the supply and exhaust passages therefor, the piston being shown at top dead center with the slide valve in position for supplying pressure to the chamber above the piston, the slide valve having pressure fed to one side thereof for maintaining the valve in the supply position.
Figure 8:
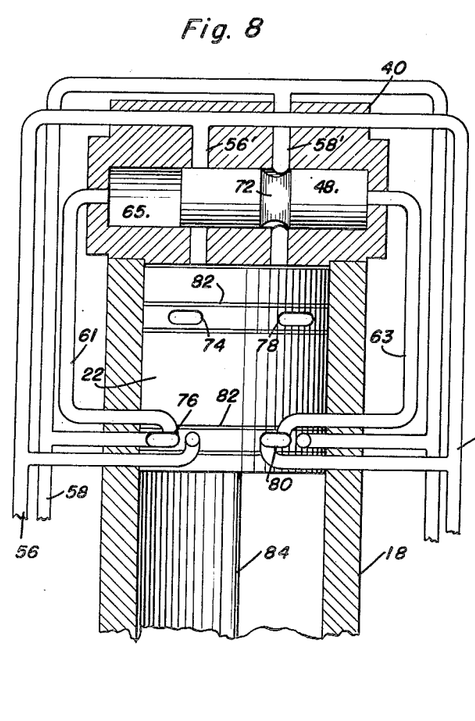
Figure 8 is a diagrammatic view similar to Figure 7 but wherein the slide valve is in the position immediately preceding the position assumed in Figure 7, the pressure being supplied to one side of the slide valve for effecting movement to its other position and the slide valve providing communication between the chamber above the piston and the exhaust passage until the end of the piston stroke.

Figure 8 shows the piston at top dead center immediately after the exhaust stroke, the exhaust being completed and interconnection between the supply passage and the fourth passage being effected for supplying pressure to the one side of the piston valve 48 for moving the valve toward the left, thereby cutting off the exhaust above the piston 22 and also opening the supply passage 56. Figure 7 shows the slide valve moved to supply position as a result of the arrangement of the piston and valve of Figure 8. The grooves 76 and 80 at the lower intermediate portions of the piston 22 provide intercommunication between the exhaust passage 58 and the third passage 61 whereby exhaust from the chamber portion 65 can be accomplished for permitting movement of the valve 48 to the left, in Figure 8. At the same time, the groove 80 provides intercommunication between the supply passage 58 and the fourth passage 63 to supply pressure to the side of the slide valve 48 opposite to the chamber 65 for moving the valve 48 to the left. Thus, pressure will be supplied through the reduced cross-sectional portion of the slide valve 48 and will enter the chamber above the piston 22 for effecting downward movement thereof.

Figures 9, 13, 14:
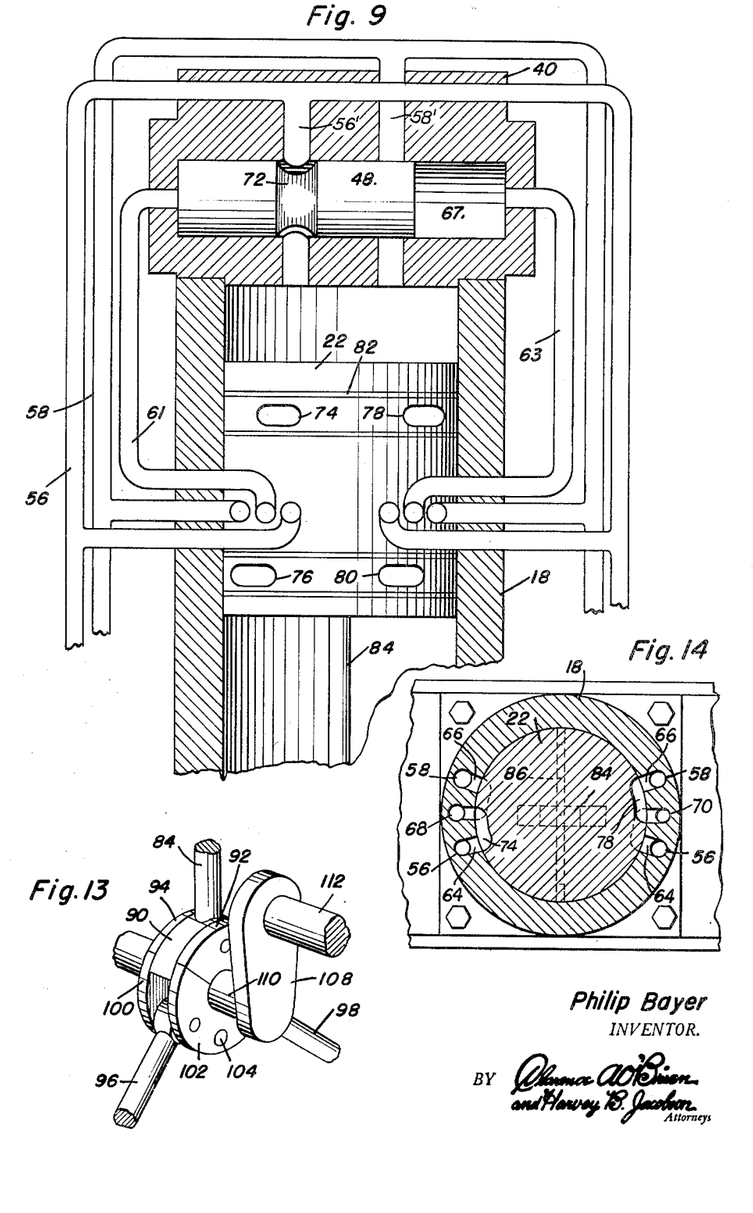
Figure 9 is similarly a diagrammatic view showing the piston in an inner intermediate portion with the slide valve in position for supplying pressure to the chamber above the piston, the piston moving downwardly in its pressure stroke.
Figure 13 is a detail perspective showing the crank and connecting rod assembly with parts broken away.
Figure 14 is a horizontal transverse sectional view taken substantially along the plane of line 14—14 of Figure 3.

Figure 9 shows the arrangement of the valve and piston at an intermediate point of the pressure stroke, pressure being continuously supplied to the chamber above the piston 22 for further downward movement.

Figure 10:
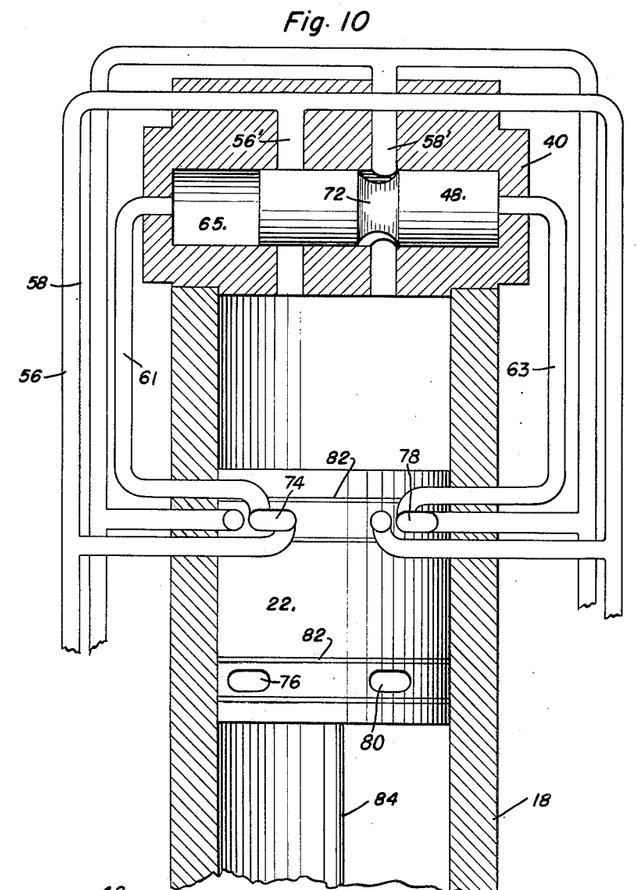
Figure 10 is a diagrammatic view showing the piston in its lowermost position with the grooves in the wall of the piston effecting movement of the slide valve to the position for exhausting the pressure above the piston through the exhaust passage.
Figure 11:
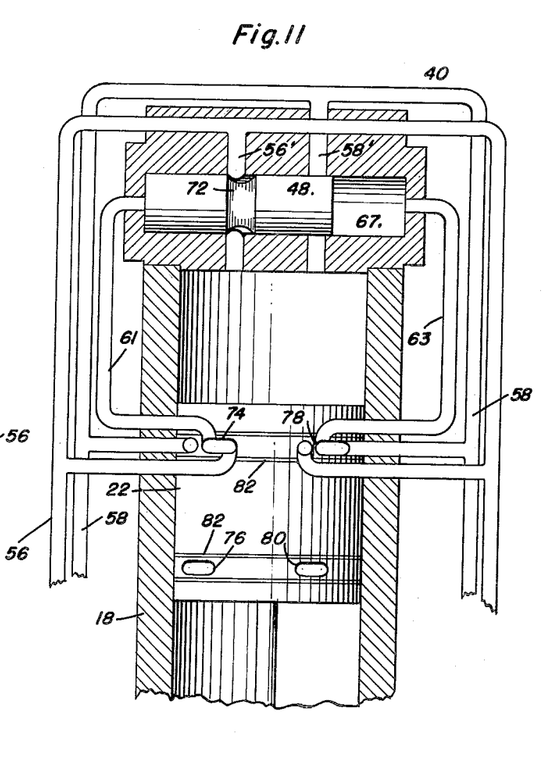
Figure 11 is also a diagrammatic view of the piston in its lowermost position but showing the slide valve in the position immediately preceding the intercommunication between the supply passage and the left side of the slide valve, whereby when the communication is completed, the slide valve will be moved to the right to effect exhaust of the chamber above the piston.
Figure 12:
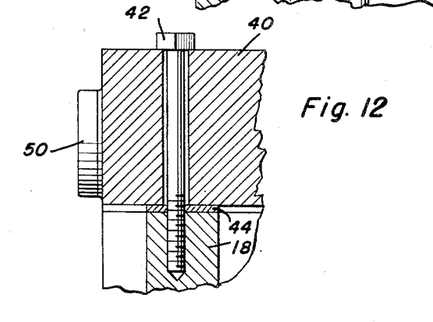
Figure 12 is a detail vertical transverse sectional view taken substantially along the plane of line 12—12 of Figure 6.

Figures 10 and 11 show the piston in its lowermost position, Figure 11 showing the slide valve immediately preceding the movement effected by the pressure on the left side of the valve as a result of the intercommunication effected by the groove 74 of the one side of the valve and the groove 78 of the other side. Thus, the supply passage 56 is interconnected with the third passage 61 to provide pressure against the valve 48 while the groove 78 maintains intercommunication between the exhaust passage 58 and the fourth passage 63 whereby the chamber 67 on the right hand side of the valve 48 can be exhausted.

As soon as the slide valve 48 moved to the position shown in Figure 10, the pressure above the piston 22 will be exhausted through the second passage 58' and the piston will be ready for its upward stroke to renew its cycle starting with Figure 8.

In view of the foregoing, it is believed that a hydraulic engine has been provided which will operate in an effective manner, the cooperation between the slide valve 48 and the piston 22 of each section of the engine being so related as to be interpendent, thereby providing efficient supplying and exhausting of the chamber above the piston. It is to be further noted that with the present arrangement, relatively few parts are required to assemble the entire invention.

It is therefore believed that a device has been provided which will accomplish all of the objects hereinabove set forth.

Having described the invention, what is claimed as new is:

1. A hydraulic engine comprising a housing of tubular form, a piston reciprocably disposed in a chamber in said housing, supply and exhaust passages formed in the wall of said housing, a valve casing secured to the outer end of said housing and having a transversely extending bore, valve means in said bore, first and second passages extending transversely of said bore and intercommunicating said supply and exhaust passages with the chamber above said piston, said valve means being reciprocable for effecting selective communication through said first and second passages, and means for effecting reciprocation of said valve means, said last named means including third and fourth passages interconnecting the ends of said bore and intermediate portions of the chamber in said housing, said supply and exhaust passages being disposed on opposite sides of each of said third and fourth passages and having openings communicating with said chamber at said intermediate portions thereof, and groove means formed in the wall of said piston for selectively intercommunicating said supply and exhaust with said fourth passage whereby reciprocation of said valve means is effected, thereby alternately supplying and exhausting pressure to said chamber above the piston.

2. A hydraulic engine comprising a housing of tubular form, a piston reciprocably disposed in a chamber in said housing, supply and exhaust passages formed in the wall of said housing, a valve casing secured to the outer end of said housing and having a transversely extending bore, valve means in said bore, first and second passages extending transversely of said bore and intercommunicating said supply and exhaust passages with the chamber above said piston, said valve means being reciprocable for effecting selective communication through said first and second passages, said valve means including a valve plug having a reduced cross-sectional area at an intermediate portion thereof and slidably disposed in said bore, said reduced cross-sectional area portion being selectively positionable in the path of said first and second passages for providing flow therethrough, and means for effecting reciprocation of said valve means, said last named means including third and fourth passages interconnecting the ends of said bore and intermediate portions of the chamber in said housing, said supply and exhaust passages being disposed on opposite sides of each of said third and fourth passages and having openings communicating with said chamber at said intermediate portions thereof, and groove means formed in the wall of said piston for selectively intercommunicating said supply and exhaust with said third passage and said supply and exhaust with said fourth passage whereby reciprocation of said valve means is effected, thereby alternately supplying and exhausting pressure to said chamber above the piston.

3. A hydraulic engine comprising a housing or tubular form, a piston reciprocably disposed in a chamber in said housing, supply and exhaust passages formed in the wall of said housing, a valve casing secured to the outer end of said housing and having a transversely extending bore, valve means in said bore, first and second passages extending transversely of said bore and intercommunicating said supply and exhaust passages with the chamber above said piston, said valve means being reciprocable for effecting selective communication through said first and second passages, and means for effecting reciprocation of said valve means, said last named means including third and fourth passages interconnecting the ends of said bore and intermediate portions of the chamber in said housing, said supply and exhaust passages being disposed on opposite sides of each of said third and fourth passages and having openings communicating with said chamber at said intermediate portions thereof, and groove means formed in the wall of said piston for selectively intercommunicating said supply and exhaust with said fourth passage whereby reciprocation of said valve means is effected thereby alternately supplying and exhausting pressure to said chamber above the piston, said groove means including upper and lower intermediate piston wall portions formed with grooves therein for selectively interconnecting preselected of said passages.

4. A hydraulic engine comprising a housing or tubular form, a piston reciprocably disposed in a chamber in said housing, supply and exhaust passages formed in the wall of said housing, a valve casing secured to the outer end of said housing and having a transversely extending bore, valve means in said bore, first and second passages extending transversely of said bore and intercommunicating said supply and exhaust passages with the chamber above said piston, said valve means being reciprocable for effecting selective communication through said first and second passages, and means for effecting reciprocation of said valve means, said last named means including third and fourth passages interconnecting the ends of said bore and intermediate portions of the chamber in said housing, said supply and exhaust passages being disposed on opposite sides of each of said third and fourth passages and having openings communicating with said chamber at said intermediate portions thereof, and groove means formed in the wall of said piston for selectively intercommunicating said supply and exhaust with said fourth passage whereby reciprocation of said valve means is effected, thereby alternately supplying and exhausting pressure to said chamber above the piston, said groove means including upper and lower intermediate and opposite piston wall portions formed with grooves therein for selectively intercommunicating preselected of said passages.

5. A hydraulic engine comprising a housing or tubular form, a piston reciprocably disposed in a chamber in said housing, supply and exhaust passages formed in the wall of said housing, a valve casing secured to the outer end of said housing and having a transversely extending bore, valve means in said bore, first and second passages extending transversely of said bore and intercommunicating said supply and exhaust passages with the chamber above said piston, said valve means being reciprocable for effecting selective communication through said first and second passages, and means for effecting reciprocation of said valve means, said last named means including third and fourth passages interconnecting the ends of said bore and intermediate portions of the chamber in said housing, said supply and exhaust passages being disposed on opposite sides of each of said third and fourth passages and having openings communicating with said chamber at said intermediate portions thereof, and groove means formed in the wall of said piston for selectively intercommunicating said supply and exhaust with said fourth passage whereby reciprocation of said valve means is effected, thereby alternately supplying and exhausting pressure to said chamber above the piston, said groove means including upper and lower, intermediate and opposite piston wall portions formed with grooves therein for selectively intercommunicating said third and fourth passages with preselected of said supply and exhaust passages.

6. A hydraulic engine comprising a housing including a plurality of tubular portions each having a piston slidably disposed in a chamber thereof, supply and exhaust passages formed in the wall of said housing, a valve casing secured to the outer end of each of said portions and having a bore extending transversely thereof, valve means in said bore of each casing, first and second passages extending transversely of each bore and interconnecting said supply and exhaust passages with each of the chambers above its respective piston, said valve means being reciprocable for effecting selective communication through said first and second passages and means for effecting reciprocation of said valve means, said last named means including third and fourth passages interconnecting the ends of each of said bores and an intermediate portion of each of the chambers in said housing, said supply and exhaust passages being disposed on opposite sides of each of said third and fourth passages and having openings communicating with each of said chambers at said intermediate portion thereof, and groove means formed in the wall of each of the pistons for selectively intercommunicating said supply and exhaust with said third passage and said supply and exhaust with said fourth passage whereby reciprocation of said valve means is effected, thereby alternately supplying and exhausting pressure to each of said chambers above its respective piston.

7. A hydraulic engine comprising a housing including a plurality of tubular portions each having a piston slidably disposed in a chamber thereof, supply and exhaust passage formed in the wall of said housing, a valve casing secured to the outer end of each of said portions and having a bore extending transversely thereof, valve means in said bore of each casing, first and second passages extending transversely of each bore and interconnecting said supply and exhaust passages with each of the chambers above its respective piston, said valve means being reciprocable for effecting selective communication through said first and second passages and means for effecting reciprocation of said valve means, each of said valve means including a valve plug having a reduced cross-sectional area at an intermediate portion thereof and slidably disposed in said bore, said reduced cross sectional area portion being selectively positionable in the path of said first and second passages for providing flow therethrough, and means for effecting reciprocation of said valve means, said last named means including third and fourth passages interconnecting the ends of each of said bores and an intermediate portion of each of the chambers in said housing, said supply and exhaust passages being disposed on opposite sides of each of said third and fourth passages and having openings communicating with each of said chambers at said intermediate portion thereof, and groove means formed in the wall of each of the pistons for selectively intercommunicating said supply and exhaust with said third passage and said supply and exhaust with said fourth passage whereby reciprocation of said valve means is effected, thereby alternately supplying and exhausting pressure to each of said chambers above its respective piston.

8. A hydraulic engine comprising a housing including a plurality of tubular portions each having a piston slidably disposed in a chamber thereof, supply and exhaust passages formed in the wall of said housing, a valve casing secured to the outer end of each of said portions and having a bore extending transversely thereof, valve means in said bore of each casing, first and second passages extending transversely of each bore and interconnecting said supply and exhaust passages with each of the chambers above its respective piston, said valve means being reciprocable for effecting selective communication through said first and second passages and means for effecting reciprocation of said valve means, said last named means including third and fourth passages interconnecting the ends of each of said bores and an intermediate portion of each of the chambers in said housing, said supply and exhaust passages being disposed on opposite sides of each of said third and fourth passages and having openings communicating with each of said chambers at said intermediate portion thereof, and groove means formed in the wall of each of the pistons for selectively intercommunicating said supply and exhaust with said third passage and said supply and exhaust with said fourth passage whereby reciprocation of said valve means is effected, thereby alternately supplying and exhausting pressure to each of said chambers above its respective piston, said groove means including upper and lower intermediate piston wall portions formed with grooves therein for selectively interconnecting certain of said passages.

9. A hydraulic engine comprising a housing including a plurality of tubular portions each having a piston slidably disposed in a chamber thereof, supply and exhaust passages formed in the wall of said housing, a valve casing secured to the outer end of each of said portions and having a bore extending transversely thereof, valve means in said bore of each casing, first and second passages extending transversely of each bore and interconnecting said supply and exhaust passages with each of the chambers above its respective piston, said valve means being reciprocable for effecting selective communication through said first and second passages and means for effecting reciprocation of said valve means, said last named means including third and fourth passages interconnecting the ends of each of said bores and an intermediate portion of each of the chambers in said housing, said supply and exhaust passages being disposed on opposite sides of each of said third and fourth passages and having openings communicating with each of said chambers at said intermediate portion thereof, and groove means formed in the wall of each of said pistons for selectively intercommunicating said supply and exhaust with said third passage and said supply and exhaust with said fourth passage whereby reciprocation of said valve means is effected, thereby alternately supplying and exhausting pressure to each of said chambers above its respective piston, said groove means including upper and lower, an intermediate and opposite piston wall portion formed with grooves therein for selectively intercommunicating certain of said passages.

PHILIP BAYER.

References Cited in the file of this patent

UNITED STATES PATENTS

| Number | Name | Date |
|---|---|---|
| 156,907 | Brandon et al. | Nov. 17, 1874 |
| 325,079 | Hill | Aug. 25, 1885 |
| 481,520 | Bartholomew | Aug. 23, 1892 |
| 511,868 | Tubbs | Jan. 2, 1894 |
| 757,532 | Williams | Apr. 19, 1904 |
| 949,901 | Janik | Feb. 22, 1910 |
| 1,187,091 | Porter | June 13, 1916 |
| 1,306,301 | Chadwick | June 10, 1919 |
| 2,348,243 | Cole | May 9, 1944 |